(12) United States Patent
Isobe et al.

(10) Patent No.: US 8,629,198 B2
(45) Date of Patent: Jan. 14, 2014

(54) NON-AQUEOUS INKJET INK AND INK SET

(75) Inventors: Kozo Isobe, Shiga (JP); Kengo Nagae, Shiga (JP)

(73) Assignee: General Technology Co., Ltd., Shiga (JP)

( * ) Notice: Subject to any disclaimer, the term of this patent is extended or adjusted under 35 U.S.C. 154(b) by 292 days.

(21) Appl. No.: 12/929,557

(22) Filed: Feb. 1, 2011

(65) Prior Publication Data

US 2011/0190427 A1 Aug. 4, 2011

(30) Foreign Application Priority Data

Feb. 2, 2010 (JP) .................................. 2010-21433
Dec. 22, 2010 (JP) ................................ 2010-286398

(51) Int. Cl.
| | |
|---|---|
| *B32B 7/12* | (2006.01) |
| *C04B 24/26* | (2006.01) |
| *C08F 2/42* | (2006.01) |
| *C08F 214/06* | (2006.01) |
| *C08G 73/10* | (2006.01) |
| *C08J 3/22* | (2006.01) |
| *C08K 5/06* | (2006.01) |
| *C08K 5/13* | (2006.01) |
| *C08K 5/16* | (2006.01) |
| *C08K 5/17* | (2006.01) |
| *C08L 27/00* | (2006.01) |
| *C08L 31/02* | (2006.01) |
| *C09D 5/00* | (2006.01) |
| *C09D 5/02* | (2006.01) |
| *C09D 11/00* | (2006.01) |

(52) U.S. Cl.
USPC ........... 523/160; 523/161; 524/186; 524/257; 524/323; 524/344; 524/347; 524/366; 524/376; 524/378; 524/563; 524/567

(58) Field of Classification Search
USPC .......... 523/160, 161; 524/186, 257, 323, 344, 524/347, 366, 376, 378, 563, 567
See application file for complete search history.

(56) References Cited

U.S. PATENT DOCUMENTS

| | | | |
|---|---|---|---|
| 7,014,698 B2 | 3/2006 | Mizutani et al. | |
| 7,132,013 B2 | 11/2006 | Mizutani et al. | |
| 7,132,014 B2 | 11/2006 | Mizutani et al. | |
| 2003/0209166 A1 | 11/2003 | Vanmaele et al. | |
| 2004/0254265 A1 | 12/2004 | Mizutani et al. | |
| 2005/0148688 A1 | 7/2005 | Mizutani et al. | |
| 2005/0148689 A1 | 7/2005 | Mizutani et al. | |
| 2006/0272547 A1 | 12/2006 | Mizutani et al. | |
| 2007/0287772 A1* | 12/2007 | Kaneko et al. | ................. 523/160 |
| 2009/0139431 A1* | 6/2009 | Shikata et al. | ............. 106/31.13 |

FOREIGN PATENT DOCUMENTS

| | | |
|---|---|---|
| JP | 2004-231870 A | 8/2004 |
| JP | 2005-023298 A | 1/2005 |
| JP | 2005-200469 A | 7/2005 |
| WO | WO-00/20521 A1 | 4/2000 |

OTHER PUBLICATIONS

"UCAR Solution Vinyl Resins for Coatings", Union Carbide Corporation, XP-002635990, pp. 1-32.

* cited by examiner

*Primary Examiner* — Patrick Niland
(74) *Attorney, Agent, or Firm* — Rabin & Berdo, P.C.

(57) ABSTRACT

Disclosed is a non-aqueous inkjet ink that includes a polyvinyl chloride resin synthesized by a suspension polymerization method or an emulsion polymerization method; an organic solvent that is a mixed solvent comprising diethylene glycol ethyl methyl ether, diethylene glycol diethyl ether, and diethylene glycol monoethyl ether in which the polyvinyl chloride resin is dissolved; a pigment; and a radical polymerization inhibitor. In another embodiment, the mixed solvent includes N-methyl-2-pyrrolidone, diethylene glycol diethyl ether, and diethylene glycol monoethyl ether. The radical polymerization inhibitor prevents the polyvinyl chloride resin from gelling in a short period and causing a discharge fault, clogging, etc. Also disclosed is an ink set of inkjet inks includes a combination of the non-aqueous inkjet inks above having respective colors and including at least a cyan ink; a magenta ink; a yellow ink; and a black ink.

9 Claims, No Drawings

NON-AQUEOUS INKJET INK AND INK SET

BACKGROUND OF THE INVENTION

The present invention relates in particular to a non-aqueous inkjet ink suitable for printing images, characters, etc., on a surface of a polyvinyl chloride sheet, etc.

Conventionally, inkjet printing, with which images, characters, etc., are printed by discharging an inkjet ink as microscopic droplets from a nozzle of an inkjet printer, is favorably used for printing mainly onto paper or other water-absorbing surface. As the inkjet ink for this purpose, an aqueous inkjet ink having a water-soluble dye or other colorant added therein is widely used in general.

However, recently, inkjet printing is being used to perform printing onto various surfaces, especially in business applications and in various other fields. There is a demand for printing images and characters, not only with good image quality but also with good water resistance, light resistance, friction resistance, etc., on the various surfaces.

For this purpose, non-aqueous inkjet inks that practically do not contain water as a solvent and use only organic solvents, and inkjet printers that use such inks are being put to practical use and becoming popularly used in place of aqueous inkjet inks.

For example, a large-size inkjet printer for printing images and characters on a surface of a polyvinyl chloride sheet, etc., that is frequently used as a medium, for example, for outdoor advertisements is becoming popularly used.

As the non-aqueous inkjet ink used in the inkjet printer, an ink containing a pigment with excellent light resistance, a binder resin for fixing the pigment onto a surface of a polyvinyl chloride sheet, etc., and an organic solvent capable of dissolving the binder resin is mainly used.

As the binder resin, any of various resins that are excellent in fixing property with respect to the surface of a polyvinyl chloride sheet, etc., such as an acrylic resin, polyester resin, polyurethane resin, polyvinyl chloride resin, nitrocellulose resin, etc., is used, and among these, a polyvinyl chloride resin, which is best in fixing property, is used favorably.

Also, by copolymerizing vinyl acetate with vinyl chloride, the solubility in the organic solvent can be improved, and images and characters printed on the surface of the polyvinyl chloride sheet can be increased in flexibility to improve scratch resistance of a print. A vinyl chloride-vinyl acetate copolymer is thus used especially favorably as the polyvinyl chloride resin.

A non-aqueous inkjet ink using a vinyl chloride-vinyl acetate copolymer or other polyvinyl chloride resin is described, for example, in JP 2004-231870A, JP 2005-23298A, JP 2005-200469A, etc.

Also, a metal coordination compound or other additive is added in a non-aqueous inkjet ink.

A surface of a nozzle plate, etc., making up a nozzle of an inkjet printer must have a property of appropriately repelling a non-aqueous inkjet ink in order to discharge the non-aqueous inkjet ink satisfactorily through the nozzle.

A coating film having a property of repelling the non-aqueous inkjet ink is thus formed on the surface of the nozzle plate, etc. As the coating film, a eutectoid coating film of a fluororesin and nickel, etc., is used.

The metal coordination compound coordinates to the nickel in the eutectoid coating film and thereby functions to improve resistance of the eutectoid coating film against the organic solvent contained in the non-aqueous inkjet ink.

Nitrogen-containing compounds, such as imidazoles, benzotriazoles, etc., can be cited as examples of the metal coordination compound.

SUMMARY OF THE INVENTION

Conventionally, as the polyvinyl chloride resin, that synthesized by a solution polymerization method is generally used. However, with the solution polymerization method, a large amount of an organic solvent must be used in synthesizing the polyvinyl chloride resin and treatment thereof is a problem.

That is, an easiest method for taking out the synthesized polyvinyl chloride resin from inside a reaction system is to remove the organic solvent by performing a drying process, that is, by letting the organic solvent evaporate into air. However, recently, in consideration of lightening an environmental load, it is becoming necessary to recover the organic solvent by an exhaust treatment, waste liquid treatment, etc., and thereby avoid letting the organic solvent evaporate into air as much as possible.

Equipment required for such treatments, energy required for operation of such equipment, etc., lower productivity of polyvinyl chloride resin and cause rise of production cost.

Use of a polyvinyl chloride resin synthesized by a suspension polymerization method or emulsion polymerization method that does not require the use of a large amount of an organic solvent as in the solvent polymerization method is thus being examined.

However, examination by the present inventor showed that a non-aqueous inkjet ink prepared using a polyvinyl chloride resin synthesized by either of these methods tends to gel within a short period in comparison to a polyvinyl chloride resin synthesized by the conventional solution polymerization method.

Gelling occurs especially readily in a case of storage upon vacuum filling in a bag made of an aluminum laminate material, etc., that is generally used as a means for supplying ink to a large-size inkjet printer.

When the polyvinyl chloride resin gels, it becomes difficult for a predetermined amount of the ink to be discharged appropriately through the nozzle of the inkjet printer or the nozzle becomes clogged so that the ink cannot be discharged at all. A problem that images, characters, etc., of satisfactory image quality cannot be printed thus occurs. Gelling of the polyvinyl chloride resin must be suppressed as much as possible.

An object of the present invention is to provide a non-aqueous inkjet ink, which contains a polyvinyl chloride resin synthesized by a suspension polymerization method or an emulsion polymerization method and yet with which there is no possibility of the polyvinyl chloride resin gelling within a short period and thereby causing a discharge fault, clogging, etc., and an ink set that includes the non-aqueous inkjet ink.

The inventor examined causes as to why a polyvinyl chloride resin synthesized by the suspension polymerization method or the emulsion polymerization method gels within a short period. As a result, the inventor found that one cause of gelling readily is that the polyvinyl chloride resin synthesized by the suspension polymerization method or the emulsion polymerization method is high in a residual amount of unreacted monomer in comparison to a resin synthesized by the solution polymerization method.

That is, as is well known, the oxygen contained in air acts as a polymerization inhibitor of a radical polymerization reaction. However, when a non-aqueous inkjet ink is vacuum filled in the bag and air is cut off, a state in which the unreacted monomer undergoes the radical polymerization reaction readily is entered.

A thermal history, etc., during storage after filling in the bag then acts as a trigger that starts the radical polymerization reaction, and gelling of the polyvinyl chloride resin and various accompanying problems occur more readily the greater the residual amount of the unreacted monomer.

Also, by examination by the inventor, it was found that especially when the non-aqueous inkjet ink contains a basic component with a pH in excess of 9, the basic component promotes the radical polymerization reaction and the accompanying gelling of the polyvinyl chloride resin.

By further examination, the inventor found that making a radical polymerization inhibitor having a function of inhibiting the radical polymerization reaction be contained in the non-aqueous inkjet ink in advance is especially effective for preventing gelling.

The present invention thus provides a non-aqueous inkjet ink including a polyvinyl chloride resin synthesized by a suspension polymerization method or an emulsion polymerization method, an organic solvent for dissolving the polyvinyl chloride resin, a pigment, and a radical polymerization inhibitor.

Although a radical polymerization inhibitor is a known component, that the radical polymerization inhibitor (a) is included in the non-aqueous inkjet ink containing the polyvinyl chloride resin, with which the polymerization reaction is completed and further polymerization reaction, crosslinking reaction, etc., is not presumed, and (b) thereby prevents a radical polymerization reaction of an unreacted monomer that causes gelling of the polyvinyl chloride resin, and (c) further that the cause of gelling of the polyvinyl chloride resin is the unreacted monomer contained at a large amount especially in the polyvinyl chloride resin synthesized by the suspension polymerization method or the emulsion polymerization method, etc., are facts found for the first time and clarified for the first time by the inventor in completing the present invention and are by no means known facts.

As the radical polymerization inhibitor, at least one type selected from the group consisting of hydroquinones, catechols, hindered amines, phenols, phenothiazines, and condensed aromatic ring quinones can be cited.

As is done conventionally, the non-aqueous inkjet ink may contain a metal coordination compound or other additive. Benzotriazoles are preferable as metal coordination compounds. In addition to being excellent in function as metal coordination compounds, the benzotriazoles do not exhibit basicity and thus do not have a possibility of promoting a radical polymerization reaction.

In a cyan non-aqueous inkjet ink that uses a phthalocyanine pigment as the pigment, it is preferable to use a hindered amine as the radical polymerization inhibitor. A content proportion of the hindered amine is preferably no less than 0.2 mass % and no more than 2 mass % of a total amount of the non-aqueous inkjet ink.

In a magenta non-aqueous inkjet ink that uses a quinacridone pigment as the pigment, it is preferable to use a hindered phenol as the radical polymerization inhibitor. The content proportion of the hindered phenol is preferably no less than 0.05 mass % and no more than 2 mass % of the total amount of the non-aqueous inkjet ink.

In a yellow non-aqueous inkjet ink that uses a chelate azo pigment as the pigment, it is preferable to use a hindered amine as the radical polymerization inhibitor. The content proportion of the hindered amine is preferably no less than 0.05 mass % and no more than 2 mass % of the total amount of the non-aqueous inkjet ink.

In a black non-aqueous inkjet ink that uses carbon black as the pigment, it is preferable to use a hindered amine as the radical polymerization inhibitor. The content proportion of the hindered amine is preferably no less than 0.05 mass % and no more than 2 mass % of the total amount of the non-aqueous inkjet ink.

The organic solvent is preferably a mixed solvent of diethylene glycol ethyl methyl ether and at least one type of solvent selected from the group consisting of diethylene glycol diethyl ether, tetraethylene glycol dimethyl ether, and propylene glycol dimethyl ether.

Also, the mixed solvent may further contain at least one type of solvent selected from the group consisting of ethylene glycol monobutyl ether, diethylene glycol monoethyl ether, triethylene glycol monomethyl ether, propylene glycol monobutyl ether, dipropylene glycol monomethyl ether, dipropylene glycol dimethyl ether, and tripropylene glycol dimethyl ether.

The present invention provides an ink set that includes at least non-aqueous inkjet inks of respective colors of cyan, magenta, yellow, and black and with which the non-aqueous inkjet ink of at least one of the respective colors is the non-aqueous inkjet ink according to the present invention.

By the present invention, a non-aqueous inkjet ink, which contains a polyvinyl chloride resin synthesized by a suspension polymerization method or an emulsion polymerization method and yet with which there is no possibility of the polyvinyl chloride resin gelling within a short period and thereby causing a discharge fault, clogging, etc., and an ink set that includes the non-aqueous inkjet ink can be provided.

DETAILED DESCRIPTION OF THE INVENTION

<<Non-Aqueous Inkjet Ink>>

A non-aqueous inkjet ink according to the present invention is characterized in including a polyvinyl chloride resin synthesized by a suspension polymerization method or an emulsion polymerization method, an organic solvent for dissolving the polyvinyl chloride resin, a pigment, and a radical polymerization inhibitor.

<Polyvinyl Chloride Resin>

As the polyvinyl chloride resin, any of various polyvinyl chloride resins synthesized by the suspension polymerization method or the emulsion polymerization method may be used. In particular, a vinyl chloride-vinyl acetate copolymer synthesized by the suspension polymerization method or the emulsion polymerization method is preferable as the polyvinyl chloride resin. When vinyl chloride is copolymerized with vinyl acetate, solubility in the organic solvent can be improved, and images and characters printed on a surface of a polyvinyl chloride sheet, etc., can be increased in flexibility to improve scratch resistance of a print.

A molecular weight, vinyl acetate content, etc., of the vinyl chloride-vinyl acetate copolymer may be set as suited.

For example, a vinyl chloride-vinyl acetate copolymer synthesized by the suspension polymerization method has a number average molecular weight $M_n$ of preferably no less than 5000 and especially preferably no less than 10000, and preferably no more than 100000 and especially preferably no more than 30000.

When the number average molecular weight $M_n$ is less than the above range, a fixing property of the vinyl chloride-vinyl acetate copolymer with respect to the polyvinyl chloride sheet decreases and the scratch resistance, etc., of the print may decrease.

On the other hand, when the above range is exceeded, the non-aqueous inkjet ink becomes too high in viscosity and it may not be possible to satisfactorily discharge the non-aqueous inkjet ink as droplets through a nozzle of an inkjet printer.

Also, the vinyl acetate content of the vinyl chloride-vinyl acetate copolymer is preferably no less than 1 mass %, more preferably no less than 10 mass %, and especially preferably no less than 13 mass %, and preferably no more than 36 mass %, more preferably no more than 22 mass %, and especially preferably no more than 15 mass %.

When the vinyl acetate content is less than the above range, a solubility of the vinyl chloride-vinyl acetate copolymer particularly in a first organic solvent to be described below decreases so that precipitation occurs readily and the non-aqueous inkjet ink may thereby decrease in stability.

On the other hand, when the above range is exceeded, the fixing property of the vinyl chloride-vinyl acetate copolymer with respect to the polyvinyl chloride sheet decreases and the scratch resistance, etc., of the print may decrease.

Examples of the vinyl chloride-vinyl acetate copolymer synthesized by the suspension polymerization method include one type or two or more types among SOLBIN CL (number average molecular weight Mn: 25000, vinyl acetate content: 14 mass %), SOLBIN CNL (number average molecular weight Mn: 12000, vinyl acetate content: 10 mass %), SOLBIN C5R (number average molecular weight Mn: 27000, vinyl acetate content: 21 mass %), SOLBIN AL (number average molecular weight Mn: 22000, vinyl acetate content: 2 mass %), SOLBIN TA5R (number average molecular weight Mn: 28000, vinyl acetate content: 1 mass %), SOLBIN TA0 (number average molecular weight Mn: 15000, vinyl acetate content: 2 mass %), SOLBIN TA3 (number average molecular weight Mn: 24000, vinyl acetate content: 4 mass %), etc., which are vinyl chloride-vinyl acetate copolymers of the SOLBIN (registered trademark) series manufactured by Nissin Chemical Industry Co., Ltd.

A vinyl chloride-vinyl acetate copolymer synthesized by the emulsion polymerization method has a weight average molecular weight Mw of preferably no less than 5000, more preferably no less than 30000, and especially preferably no less than 45000, and preferably no more than 100000, more preferably no more than 60000, and especially preferably no more than 55000.

When the weight average molecular weight Mw is less than the above range, the fixing property of the vinyl chloride-vinyl acetate copolymer with respect to the polyvinyl chloride sheet decreases and the scratch resistance, etc., of the print may decrease.

On the other hand, when the above range is exceeded, the non-aqueous inkjet ink becomes too high in viscosity and it may not be possible to satisfactorily discharge the non-aqueous inkjet ink as droplets through a nozzle of an inkjet printer.

Also, the vinyl acetate content of the vinyl chloride-vinyl acetate copolymer is preferably no less than 1 mass %, more preferably no less than 10 mass %, and especially preferably no less than 14 mass %, and preferably no more than 36 mass %, more preferably no more than 20 mass %, and especially preferably no more than 16 mass %.

When the vinyl acetate content is less than the above range, the solubility of the vinyl chloride-vinyl acetate copolymer particularly in the first organic solvent to be described below decreases so that precipitation occurs readily and the non-aqueous inkjet ink may thereby decrease in stability.

On the other hand, when the above range is exceeded, the fixing property of the vinyl chloride-vinyl acetate copolymer with respect to the polyvinyl chloride sheet decreases and the scratch resistance, etc., of the print may decrease.

Examples of the vinyl chloride-vinyl acetate copolymer synthesized by the emulsion polymerization method include one type or two or more types among VINNOL E15/45 (weight average molecular weight Mw: 45000 to 55000, vinyl acetate content: 15.0±1.0 mass %), VINNOL H14/36 (weight average molecular weight Mw: 30000 to 40000, vinyl acetate content: 14.4±1.0 mass %), VINNOL H15/42 (weight average molecular weight Mw: 35000 to 50000, vinyl acetate content: 14.0±1.0 mass %), VINNOL H40/43 (weight average molecular weight Mw: 40000 to 50000, vinyl acetate content: 34.3±1.0 mass %), VINNOL E15/45M (weight average molecular weight Mw: 50000 to 60000, vinyl acetate content: 15.0±1.0 mass %), VINNOL E15/40M (weight average molecular weight Mw: 40000 to 50000, vinyl acetate content: 15.0±1.0 mass %), etc., which are vinyl chloride-vinyl acetate copolymers of the VINNOL (registered trademark) series manufactured by Wacker Chemie AG.

The content proportion of the polyvinyl chloride resin with respect to the total amount of the non-aqueous inkjet ink is preferably no less than 1 mass % and especially preferably no less than 3 mass %, and preferably no more than 10 mass % and especially preferably no more than 7 mass %.

When the content proportion is less than the above range, the effect due to containing of the polyvinyl chloride resin, that is, the effect of fixing the pigment onto a surface of a polyvinyl chloride sheet, etc., cannot be obtained adequately and the scratch resistance of the print may decrease.

On the other hand, when the content proportion exceeds the above range, the non-aqueous inkjet ink becomes too high in viscosity and it may not be possible to satisfactorily discharge the non-aqueous inkjet ink as droplets through a nozzle of an inkjet printer.

<Organic Solvent>

As the organic solvent, any of various organic solvents that can satisfactorily dissolve the polyvinyl chloride resin may be used. Aprotic polar solvents, such as N-methyl-2-pyrrolidone and other nitrogen-containing heterocyclic compounds and γ-butyrolactone and other oxygen-containing heterocyclic compounds, etc., can be cited as examples of the organic solvent. However, an aprotic polar solvent may degrade the above-described eutectoid coating film of a fluororesin and nickel in a short period. Also, an aprotic polar solvent has a possibility of readily causing gelling of the polyvinyl chloride resin.

As the organic solvent, it is preferable to use an alkylene glycol derivative that does not readily cause the gelling and with which there is no possibility of degrading the eutectoid coating film, etc., in a short period.

Also, as the organic solvent, it is further preferable to use, from among the below-described three types of first to third organic solvents that are all alkylene glycol derivatives, a mixed solvent of the two types of the first and second organic solvents or a mixed solvent of the three types of the first to third organic solvents.

When any of the above mixed solvents is used, the polyvinyl chloride resin and the pigment can be fixed firmly onto the surface of the polyvinyl chloride sheet, etc., and images, characters, etc., of excellent water resistance, light resistance, scratch resistance, etc., can be printed. Also, gelling of the polyvinyl chloride resin in a short period and aggregation and sedimentation of the pigment in a short period can be prevented. Moreover with these mixed solvents, there is no possibility of degrading the eutectoid coating film in a short period.

As the first to third organic solvents that are mixed, it is preferable to combine and use organic solvents that do not exhibit basicity in particular, or more specifically, organic solvents with a pH of approximately 2 to 9. This is because with such organic solvents that do not exhibit basicity, there is no possibility of promotion of a radical polymerization reaction of unreacted monomer as described above or inhibition of the function of the radical polymerization inhibitor.

(First Organic Solvent)

One type or two or more types among ethylene glycol dimethyl ether, diethylene glycol dimethyl ether, diethylene glycol ethyl methyl ether (pH=6.8), etc.

(Second Organic Solvent)

One type or two or more types among diethylene glycol diethyl ether (pH=4.0), diethylene glycol isopropyl methyl ether, diethylene glycol butyl methyl ether, tetraethylene glycol dimethyl ether (pH=6.7), propylene glycol dimethyl ether (pH=2.6), etc.

(Third Organic Solvent)

One type or two or more types among ethylene glycol monomethyl ether, ethylene glycol monobutyl ether (pH=4.9), diethylene glycol monoethyl ether (pH=7.6), diethylene glycol monobutyl ether, diethylene glycol dibutyl ether, triethylene glycol monomethyl ether (pH=7.8), triethylene glycol monoethyl ether, triethylene glycol monobutyl ether, triethylene glycol butyl methyl ether, propylene glycol monomethyl ether, propylene glycol monobutyl ether (pH=6.9), isopropylene glycol monomethyl ether, dipropylene glycol monomethyl ether (pH=5.8), dipropylene glycol monoethyl ether, dipropylene glycol monobutyl ether, dipropylene glycol dimethyl ether (pH=3.5), tripropylene glycol monomethyl ether, tripropylene glycol dimethyl ether (pH=7.2), etc.

The above classification of the first to third organic solvents is based on a classification method described in JP2009-74034A.

That is, the first organic solvent is an organic solvent having both a dissolving ability as described in (1) below and a swelling ability as described in (2), the second organic solvent is an organic solvent not having the dissolving ability as described in (1) but having the swelling ability as described in (2), and the third organic solvent is an organic solvent having neither the dissolving ability as described in (1) nor the swelling ability as described in (2).

(1) Dissolving Ability Test

If after adding 0.2 g of a vinyl chloride-vinyl acetate copolymer [VYHD, made by The Dow Chemical Company, number average molecular weight Mn=22000, vinyl acetate content 14 mass %] to 20 ml of an organic solvent and performing stirring for 1 hour at 25±1° C., the entire amount of the copolymer could be dissolved (the solution became transparent), the organic solvent was evaluated as having a dissolving ability and if the entire amount of the copolymer could not be dissolved (the solution became turbid and solids precipitated) the organic solvent was evaluated as not having the dissolving ability.

A detailed procedure of the dissolving ability test is as follows.

20 ml of the organic solvent to be evaluated is placed in a beaker, a stirring element with a surface coated with Teflon (registered trademark) is placed in the beaker, and a temperature is stabilized by leaving the beaker to stand in a constant temperature bath set at 25±1° C.

A magnetic stirrer is then operated to rotate the stirring element and stirring is performed under a condition of a rotation speed of no less than 500 rpm and no more than 1000 rpm.

While stirring, 0.2 g of the powder-form vinyl chloride-vinyl acetate copolymer are added and after continuing to stir further for 1 hour, the solution is observed visually.

Then, as described above, the organic solvent with which the solution became transparent is evaluated as having the dissolving ability and that with which the solution became turbid and solids precipitated was evaluated as not having the dissolving ability.

(2) Swelling Ability Test

An unplasticized vinyl chloride pipe (VP) (JIS K67427922, Eslon pipe for water supply VP25 R00074261) defined in Japanese Industrial Standards JIS K6742:2004 and having a standard outer diameter dimension of 32.0 mm and a nominal inner diameter of 25 mm is immersed in the organic solvent, and after leaving to stand for 3 days at 60±1° C., a rate of change of the inner diameter is measured, and an organic solvent with which the rate of change is no less than 1% is evaluated as having a swelling ability and an organic solvent with which the rate of change is less than 1% is evaluated as not having the swelling ability.

A detailed procedure of the swelling ability test is as follows.

300 ml of the organic solvent to be evaluated are placed in a beaker and the beaker is left to stand in a constant temperature bath set at 60° C.±1° C. to stabilize the temperature.

The unplasticized vinyl chloride pipe (VP), which has been cut to a length of 80 mm in advance and the inner diameter of which has been measured, is then immersed in the organic solvent, and after leaving to stand for 3 days, the pipe is taken out of the organic solvent and the inner diameter is measured immediately.

An organic solvent with which the rate of change of inner diameter before and after immersion is no less than 1% is then evaluated as having the swelling ability and that with which the rate of change is less than 1% is evaluated as not having the swelling ability.

When the two types of the first and second organic solvents among the three types of the organic solvents are used in combination, the polyvinyl chloride resin can be dissolved satisfactorily without causing degradation of the eutectoid coating film, etc., in a short period.

That is, the first organic solvent is a good solvent for the polyvinyl chloride resin but is not as strong in dissolving ability as an aprotic polar solvent. The second organic solvent is even weaker in dissolving ability. Thus, with the mixed solvent of these two types of organic solvent, there is no possibility of degradation of the eutectoid coating film, etc., in a short period.

Moreover with the mixed solvent, the polyvinyl chloride resin dissolving ability of the first organic solvent can be compensated by the swelling action by the second organic solvent, and the polyvinyl chloride resin dissolving ability can thereby be improved to a level approximately equivalent to that of an aprotic polar solvent.

Thus, in combination with the molecular structures of the first and second organic solvents being mutually similar, effects of improving a storage stability of the non-aqueous inkjet ink and preventing aggregation and sedimentation of the polyvinyl chloride resin and the pigment in a short period can be provided.

Also, a permeability of the non-aqueous inkjet ink with respect to the polyvinyl chloride sheet, etc., can be improved to enable the polyvinyl chloride resin and pigment to be fixed firmly to the surface of the polyvinyl chloride sheet, etc.

Further, the third organic solvent can be used in combination to adjust a surface tension, viscosity, etc., of the non-aqueous inkjet ink in a range suited for inkjet printing.

In the mixed solvent combining the two types of the first and second organic solvents, the content proportion of the first organic solvent with respect to the total amount of the mixed solvent is preferably no less than 5 mass % and especially preferably no less than 8 mass %, and preferably no more than 50 mass % and especially preferably no more than 40 mass %.

When the content proportion is less than the above range, the effect due to the first organic solvent of improving the polyvinyl chloride resin dissolving ability and improving the storage stability of the non-aqueous inkjet ink may not be obtained adequately. Also, the effect of increasing the permeability to fix the polyvinyl chloride resin and the pigment firmly onto the surface of the polyvinyl chloride sheet, etc., may not be obtained adequately.

On the other hand, when the content proportion exceeds the above range, the dissolving ability of the mixed solvent may become too strong so that especially when solid printing is performed on the surface of the polyvinyl chloride sheet, etc., the surface may become roughened and luster, smoothness, etc., of the print may decrease.

In the mixed solvent combining the three types of the first to third organic solvents, the content proportion of the first organic solvent with respect to the total amount of the mixed solvent is preferably no less than 5 mass % and especially preferably no less than 8 mass %, and preferably no more than 50 mass % and especially preferably no more than 40 mass %. The reasons for this are the same as those in the case of the mixed solvent combining the two types of the first and second organic solvents.

Also, the content proportion of the third organic solvent with respect to the total amount of the mixed solvent is preferably no less than 1 mass % and especially preferably no less than 2 mass %, and preferably no more than 50 mass % and especially preferably no more than 40 mass %.

When the content proportion is less than the above range, the action due to containing of the third solvent of adjusting the surface tension, viscosity, etc., may not be obtained adequately.

Also, depending on the types and content proportions of the first and second organic solvents, the dissolving ability of the mixed solvent may be too strong so that especially when solid printing is performed on the surface of the polyvinyl chloride sheet, etc., the surface may become roughened and the luster, smoothness, etc., of the print may decrease.

On the other hand, when the content proportion exceeds the above range, the content proportions of the first and second organic solvents become too low relatively. Thus, the effect due to the first organic solvent of improving the polyvinyl chloride resin dissolving ability and the effect due to the second organic solvent of assisting the action of the first organic solvent may be inadequate.

As a result, the effect of improving the storage stability of the non-aqueous inkjet ink and the effect of increasing the permeability to fix the polyvinyl chloride resin and the pigment firmly onto the surface of the polyvinyl chloride sheet, etc., may not be obtained adequately.

Of the various components making up the non-aqueous inkjet ink, the pH of the components that are liquids in themselves, such as the organic solvent, etc., shall be expressed as a value measured by a glass electrode method.

That is, the pH is determined from a potential difference arising across a glass electrode and a reference electrode when both electrodes are immersed in a liquid to be measured under an environment of $25\pm1°$ C. temperature. A 3 mol/l aqueous KCl solution is used as an internal liquid inside the glass electrode.

The pH of a solid component in a case where the component is water-soluble shall be expressed as the value measured by the glass electrode method under an environment of $25\pm1°$ C. temperature with the component being put in a state of a 5% aqueous solution by dissolving in pure water. The 3 mol/l aqueous KCl solution is used as the internal liquid inside the glass electrode.

As an example of an apparatus (pH meter) for pH measurement by the glass electrode method, HM-40V made by DKK-Toa Corporation, etc., can be cited.

As a specific measurement method, the glass electrode and the reference electrode are immersed in the liquid to be measured and the pH value is read after an elapse of 1 minute. Particularly in a case of an organic solvent system, the pH value may not stabilize, and in this case a central value of fluctuation of the pH value is determined as the pH value.

As a preferable example of the mixed solvent, a mixed solvent of diethylene glycol ethyl methyl ether as the first organic solvent and at least one type of the following preferable second organic solvents can be cited.

(Preferable Second Solvents)

Diethylene glycol diethyl ether, tetraethylene glycol dimethyl ether, and propylene glycol dimethyl ether.

Also, a mixed solvent with which at least one type of the following preferable third organic solvent is added to diethylene glycol ethyl methyl ether and at least one type of the preferable second organic solvents can be cited as a preferable example.

(Preferable Third Solvents)

Ethylene glycol monobutyl ether, diethylene glycol monoethyl ether, triethylene glycol monomethyl ether, propylene glycol monobutyl ether, dipropylene glycol monomethyl ether, dipropylene glycol dimethyl ether, and tripropylene glycol dimethyl ether.

<Pigment>

As the pigment, any inorganic pigment and/or organic pigment can be cited.

Titanium oxide, iron oxide, and other metal compounds, and neutral, acidic, basic, and other various carbon blacks manufactured by such known methods as a contact method, furnace method, thermal method, etc., can be cited as examples of the inorganic pigment among the above.

Azo pigments, polycyclic pigments, dye chelates, nitro pigments, nitroso pigments, aniline black, etc., can be cited as examples of organic pigments.

Azo lakes, insoluble azo pigments, condensed azo pigments, chelate azo pigments, etc., can be cited as examples of azo pigments.

Phthalocyanine pigments, perylene pigments, perinone pigments, anthraquinone pigments, quinacridone pigments, dioxazine pigments, thioindigo pigments, isoindolinone pigments, quinophthalone pigments, etc., can be cited as examples of polycyclic pigments.

Further, basic dye chelates, acidic dye chelates, etc., can be cited as examples of dye chelates.

One type or two or more types of pigments may be used according to a color type of the non-aqueous inkjet ink. Also, the pigment may be surface-treated to improve dispersion stability in the non-aqueous inkjet ink.

The following various pigments can be cited as specific examples of the pigment.
(Cyan Pigment)
C. I. Pigment Blue 1, 2, 3, 15, 15:1, 15:3, 15:4, 15:6, 15:34, 16, 22, and 60.
(Magenta Pigment)
C. I. Pigment Red 5, 7, 9, 12, 48 (Ca), 48 (Mn), 49, 52, 53, 57 (Ca), 57:1, 97, 112, 122, 123, 149, 168, 177, 178, 179, 184, 202, 206, 207, 209, 242, 254, and 255.
(Yellow Pigment)
C. I. Pigment Yellow 1, 2, 3, 12, 13, 14, 14C, 16, 17, 20, 24, 73, 74, 75, 83, 86, 93, 94, 95, 97, 98, 109, 110, 114, 117, 120, 125, 128, 129, 130, 137, 138, 139, 147, 148, 150, 151, 154, 155, 166, 168, 180, 185, 213, and 214.
(Black Pigment)
C. I. Pigment Black 7.
(Orange Pigment)
C. I. Pigment Orange 36, 43, 51, 55, 59, 61, 71, and 74.
(Green Pigment)
C. I. Pigment Green 7 and 36.
(Violet Pigment)
C. I. Pigment Violet 19, 23, 29, 30, 37, 40, and 50.

The content proportion of the pigment with respect to the total amount of the non-aqueous inkjet ink is preferably no less than 0.1 mass % and especially preferably no less than 0.4 mass %, and preferably no more than 10 mass % and especially preferably no more than 8 mass %.

The pigment is preferably used as a manufacturing raw material of the non-aqueous inkjet ink in a state of a pigment dispersion prepared by dispersing in a suitable solvent.

As the solvent making up the pigment dispersion, any of various solvents that are soluble in the organic solvent making up the non-aqueous inkjet ink and are yet capable of satisfactorily dispersing the pigment may be used. For example, when the organic solvent is a combined system of two or more types among the three types of the first to third organic solvents, one type or two or more types of the three types of organic solvents is or are favorably used as the solvent making up the pigment dispersion.

Also, the pigment dispersion may contain various additives such as a dispersing agent for satisfactorily dispersing the pigment.

The pH of the pigment dispersion is preferably approximately 2 to 9 to prevent promotion of the radical polymerization reaction of the unreacted monomer or inhibition of the function of the radical polymerization inhibitor. For adjustment of the pH of the pigment dispersion within the above range, the type, amount, combination, etc., of the solvent, pigment, dispersing agent, etc., are selected as suited.

<Radical Polymerization Inhibitor>

As the radical polymerization inhibitor, any of various compounds having a function of trapping radicals and thereby inhibiting the radical polymerization reaction of the unreacted monomer contained in the polyvinyl chloride resin may be used.

However, a radical polymerization inhibitor that does not inhibit a dischargeability of the non-aqueous inkjet ink and yet is excellent in efficiency of polymerization inhibition effect is preferable.

The efficiency of polymerization inhibition effect refers to the content proportion of the radical polymerization inhibitor required to express the effect of inhibiting the radical polymerization reaction of the unreacted monomer at a fixed level. It can be said that the lower this content proportion, the higher the efficiency of polymerization inhibition effect.

A radical polymerization inhibitor that can efficiently inhibit the radical polymerization reaction of the monomer and suppress gelling of the polyvinyl chloride resin by being contained at as low an amount as possible is preferable.

Especially in a case of using the mixed solvent of the two types of the first and second organic solvents or the mixed solvent of the three types of the first to third organic solvents that is not as strong in dissolving ability as an aprotic polar organic solvent as described above, it is preferable to select and use a radical polymerization inhibitor of excellent efficiency of polymerization inhibition effect that provides a high polymerization inhibition effect at as low an addition amount as possible.

Satisfactory dissolution of the polyvinyl chloride resin can thereby be maintained while minimizing decrease of the content proportion of the mixed solvent due to the containing of the radical polymerization inhibitor.

As the radical polymerization inhibitor that meets these conditions, one type or two or more types among hydroquinones, catechols, hindered amines, phenols, phenothiazines, and condensed aromatic ring quinones can be cited as examples.

As examples of hydroquinones, one type or two or more types among hydroquinone, hydroquinone monomethyl ether, 1-o-2,3,5-trimethylolhydroquinone, 2-tert-butylhydroquinone, etc., can be cited.

As examples of catechols, one type or two or more types among catechol, 4-methylcatechol, and 4-tert-butylcatechol, etc., can be cited.

As examples of hindered amines, any of hindered amines having a polymerization inhibition effect can be cited, and among these, one type or two or more types of hindered amine having a tetramethylpiperidinyl group in the molecule is or are preferable.

As examples of phenols, one type or two or more types among phenol, butylhydroxytoluene, butylhydroxyanisole, pyrogallol, alkyl esters of gallic acid, hindered phenols, etc., can be cited.

As examples of phenothiazines, phenothiazine, etc., can be cited.

Further as examples of condensed aromatic ring quinones, naphthoquinone, etc., can be cited.

Among the above, hindered amines and/or hindered phenols, which are especially excellent in the efficiency of polymerization inhibition effect, are used favorably as radical polymerization inhibitors.

As the hindered amines, 4,4'-[(1,10-dioxo-1,10-decanediyl)bis(oxy)]bis[2,2,6,6-tetramethyl]-1-piperidinyloxy [alternative name: bis(2,2,6,6-tetramethyl-1-piperidinyloxy-4-yl)sebacate, Irgastab (registered trademark) UV10 made by Ciba Specialty Chemicals Corp. or equivalent product], etc., are especially preferable.

As examples of the hindered phenols, a mixture in which $\alpha,\alpha',\alpha''$-1,2,3-propanetriyltris[$\omega$-[(1-oxo-2-propene-1-yl)oxy]]-poly[oxy(methyl-1,2-ethanediyl)] has 2,6-bis(1,1-dimethylethyl)-4-(phenylmethylene)-2,5-cyclohexadine-1-one mixed therein as an effective component [Irgastab UV22 made by Ciba Specialty Chemicals Corp. (mixture with the proportion of the former being 76 to 90 mass % and the proportion of the latter being 24 to 10 mass %)], etc., are preferable.

The efficiency of polymerization inhibition effect varies greatly not only according to the type of the radical polymerization inhibitor but also according to the types of other components combined with the radical polymerization inhibitor, especially the pigment. Although the reason for this is not clear, it is considered that a structure of a chromogenic group, etc., contained in the pigment has an effect.

That is, a mechanism by which the radical polymerization reaction is inhibited differs according to the type of the radical polymerization inhibitor, and it is considered that whether a favorable effect or unfavorable effect is applied to the different mechanisms differs according to the type of the pigment, that is, according to the structure of the chromogenic group, etc.

It is thus preferable that, in accordance with the type of the pigment used, a radical polymerization inhibitor, with which the efficiency of polymerization inhibition effect is maximized when combined with the pigment, is contained at an optimal range.

For example, the following pigment and radical polymerization inhibitor combinations may be considered for inks of the respective colors of cyan, magenta, yellow, and black that are used in combination to form a full-color image on the surface of the polyvinyl chloride sheet, etc.

<Cyan Ink>

In a cyan non-aqueous inkjet ink using a phthalocyanine pigment, such as C. I. Pigment Blue 15, 15:1, 15:3, 15:4, 15:6, 15:34, etc., a hindered amine is preferably used as the radical polymerization inhibitor.

Also, as the hindered amine, Irgastab UV10 or an equivalent product is preferably used.

The content proportion of the hindered amine with respect to the total amount of the non-aqueous inkjet ink is preferably no less than 0.2 mass % and especially preferably no less than 0.5 mass %, and preferably no more than 2 mass % and especially preferably no more than 1.5 mass %.

When the content proportion is below the above range, the effect due to the hindered amine of inhibiting the radical polymerization reaction and preventing the gelling of the polyvinyl chloride resin may not be obtained adequately.

On the other hand, when the above range is exceeded, a further effect is not obtained and in addition, the excess hindered amine may inhibit color expression by the pigment and change a hue of an image or character printed on the surface of the polyvinyl chloride sheet, etc.

Also, many of the hindered amines take a form of a brown powder at room temperature.

Thus, when a large amount of the hindered amine is contained in excess of the above range, the viscosity of the non-aqueous inkjet ink becomes too high and it may not be possible to satisfactorily discharge the non-aqueous inkjet ink as droplets through the nozzle of the inkjet printer.

Further, the excess hindered amine may precipitate and decrease the fixing property of the print and decrease the image quality.

<Magenta Ink>

In a magenta non-aqueous inkjet ink using a quinacridone pigment, such as C. I. Pigment Red 122, etc., a hindered phenol is preferably used as the radical polymerization inhibitor.

Also, as the hindered phenol, Irgastab UV22 is preferably used.

The content proportion of the hindered phenol with respect to the total amount of the non-aqueous inkjet ink is preferably no less than 0.05 mass % and especially preferably no less than 0.1 mass %, and preferably no more than 2 mass % and especially preferably no more than 1 mass %.

When the content proportion is below the above range, the effect due to the hindered phenol of inhibiting the radical polymerization reaction and preventing the gelling of the polyvinyl chloride resin may not be obtained adequately.

On the other hand, when the above range is exceeded, a further effect is not obtained and in addition, the excess hindered phenol may inhibit color expression by the pigment and change the hue of an image or character printed on the surface of the polyvinyl chloride sheet, etc.

Also, many of the hindered phenols take a form of a viscous yellow liquid at room temperature.

Thus, when a large amount of the hindered phenol is contained in excess of the above range, the viscosity of the inkjet ink becomes too high and it may not be possible to satisfactorily discharge the non-aqueous inkjet ink as droplets through the nozzle of the inkjet printer.

Further, the excess hindered phenol may precipitate and decrease the fixing property of the print and decrease the image quality.

<Yellow Ink>

In a yellow non-aqueous inkjet ink using a chelate azo pigment, such as C. I. Pigment Yellow 150, etc., a hindered amine is preferably used as the radical polymerization inhibitor.

Also, as the hindered amine, Irgastab UV10 or an equivalent product is preferably used.

The content proportion of the hindered amine with respect to the total amount of the non-aqueous inkjet ink is preferably no less than 0.05 mass % and especially preferably no less than 0.1 mass %, and preferably no more than 2 mass % and especially preferably no more than 0.5 mass %.

The reasons why the above range is preferable for the content proportion of the hindered amine are the same as those in the case of the cyan non-aqueous inkjet ink.

<Black Ink>

In a black non-aqueous inkjet ink using carbon black as the pigment, a hindered amine is preferably used as the radical polymerization inhibitor.

Also, as the hindered amine, Irgastab UV10 or an equivalent product is preferably used.

The content proportion of the hindered amine with respect to the total amount of the non-aqueous inkjet ink is preferably no less than 0.05 mass % and especially preferably no less than 0.1 mass %, and preferably no more than 2 mass % and especially preferably no more than 0.5 mass %.

The reasons why the above range is preferable for the content proportion of the hindered amine are the same as those in the case of the cyan non-aqueous inkjet ink.

<Metal Coordination Compound>

The non-aqueous inkjet ink according to the present invention may contain a metal coordination compound.

As described above, the metal coordination compound coordinates to the nickel in the eutectoid coating film and thereby functions to improve resistance of the eutectoid coating film against the organic solvent.

Nitrogen-containing compounds, such as imidazoles, benzotriazoles, etc., can be cited as examples of the metal coordination compound.

Benzotriazoles are especially preferable as metal coordination compounds. In addition to being excellent in function as metal coordination compounds, the benzotriazoles do not exhibit basicity and thus do not have a possibility of promoting a radical polymerization reaction.

As specific examples of the benzotriazoles, 1-[N,N-bis(2-ethylhexyl)aminomethyl]benzotriazole, etc., can be cited. This compound is a water-soluble solid and the pH measured with a 5% aqueous solution prepared by dissolving in pure water is 7.5.

The content proportion of the metal coordination compound with respect to the total amount of the non-aqueous inkjet ink is preferably no less than 0.1 mass % and especially preferably no less than 0.3 mass %, and preferably no more than 5 mass % and especially preferably no more than 3 mass %.

When the content proportion is below the above range, the effect due to containing of the metal coordination compound of improving the resistance of the eutectoid film against the organic solvent may not be obtained adequately.

On the other hand, when the content proportion exceeds the above range, the non-aqueous inkjet ink becomes too high in viscosity and it may not be possible to satisfactorily discharge the non-aqueous inkjet ink as droplets through the nozzle of the inkjet printer.

Also, the excess metal coordination compound may precipitate to decrease the fixing property of the print and decrease the image quality.

<Others>

In addition to the above components, an epoxidized substance for trapping chlorine produced by dehydrochlorination of the polyvinyl chloride resin or any of other various additives, such as a polymer dispersing agent, surfactant, plasticizer, antistatic agent, viscosity modifier, surface tension modifier, leveling agent, antifoaming agent, antioxidant, pH adjuster, ultraviolet absorber, photostabilizer, fungicide, biocidal agent, etc., may be contained as necessary at suitable proportions in the non-aqueous inkjet ink.

<<Ink Set>>

The present invention provides an ink set that is used in an inkjet printer, is used to form, for example, a full-color image on a surface of a polyvinyl chloride sheet, etc., includes non-aqueous inkjet inks at least of respective colors of cyan, magenta, yellow, and black, and is characterized in that the non-aqueous inkjet ink of at least one of the respective colors is the non-aqueous inkjet ink according to the present invention.

The polyvinyl chloride resin that is synthesized by the suspension polymerization method or the emulsion polymerization method and is contained in the non-aqueous inkjet ink is thereby prevented from gelling in a short period and causing a discharge fault, clogging, etc., upon being vacuum filled and stored in a bag made, for example, of an aluminum laminate material, etc.

In particular, the gelling occurs most readily in a cyan non-aqueous inkjet ink that contains a phthalocyanine pigment and is least likely to occur in a yellow non-aqueous inkjet ink that contains a chelate azo pigment. Although the reason for this is not clear, it is considered that the structure of the pigment has an effect.

Thus, with the ink set, at least the cyan ink should be the non-aqueous inkjet ink according to the present invention. That is, a radical polymerization inhibitor should be contained in the cyan non-aqueous inkjet ink.

However, in consideration of reliably preventing gelling in the non-aqueous inkjet inks of the other colors to form an image, especially a full-color image of excellent image quality and color reproducibility on the surface of the polyvinyl chloride sheet, it is preferable for the inks of all four colors to contain radical polymerization inhibitors and be the non-aqueous inkjet ink according to the present invention.

In addition to the above four colors, light-color non-aqueous inkjet inks of light cyan, light magenta, light yellow, gray, etc., may be combined in the ink set.

In this case, all of the light-color non-aqueous inkjet inks are low in the amounts of pigment and polyvinyl chloride resin and are thus less likely to gel even in comparison to yellow and thus do not have to contain radical polymerization inhibitors. However in consideration of reliably preventing gelling, radical polymerization inhibitors may be contained in the light-color non-aqueous inkjet inks.

EXAMPLES

Preparation, measurement, and testing of non-aqueous inkjet inks of the following examples and comparative examples were carried out under an environment of 25±1° C. temperature and 55±1% relative humidity unless noted otherwise.

<Cyan Ink>

Example 1

While stirring 18 mass parts of diethylene glycol monoethyl ether (2EG-1E, pH=7.6), 4 mass parts of a vinyl chloride-vinyl acetate copolymer synthesized by the emulsion polymerization method [VINNOL (registered trademark) E15/45 made by Wacker Chemie AG, weight average molecular weight Mw: 45000 to 55000, vinyl acetate content: 15.0±1.0 mass %] were added and dispersed as a binder resin, and thereafter 25.3 mass parts of diethylene glycol diethyl ether (2EG-2E, pH=4.0) were added to swell the copolymer.

Then, while continuing to stir, 22 mass parts of diethylene glycol ethyl methyl ether (2EG-EM, pH=6.8) were added to dissolve the copolymer and thereafter, 0.2 mass parts of 4,4'-[(1,10-dioxo-1,10-decanediyl)bis(oxy)]bis[2,2,6,6-tetramethyl]-1-piperidinyloxy [product equivalent to Irgastab (registered trademark) UV10 made by Ciba Specialty Chemicals Corp.] as a hindered amine (radical polymerization inhibitor) and 0.5 mass parts of 1-[N,N-bis(2-ethylhexyl)aminomethyl] benzotriazole (pH measured in the state of 5% aqueous solution=7.5) as a metal coordination compound were added to prepare a resin solution.

Also, a pigment dispersion was prepared in which C. I. Pigment Blue 15:3 was dispersed as a phthalocyanine pigment in diethylene glycol diethyl ether (pigment concentration 15 mass %, pH=8.6), and 30 mass parts of the pigment dispersion were added to 70 mass parts of the resin solution prepared in advance and further stirring was performed to form a uniform phase and thereby manufacture a non-aqueous inkjet ink.

Example 2

Besides setting the amount of the hindered amine in the resin solution to 0.5 mass parts and the amount of diethylene glycol diethyl ether to 25 mass parts, a non-aqueous inkjet ink was manufactured in the same manner as in Example 1.

Example 3

Besides setting the amount of the hindered amine in the resin solution to 1 mass part and the amount of diethylene glycol diethyl ether to 24.5 mass parts, a non-aqueous inkjet ink was manufactured in the same manner as in Example 1.

Example 4

Besides setting the amount of the hindered amine in the resin solution to 1.5 mass parts and the amount of diethylene glycol diethyl ether to 24 mass parts, a non-aqueous inkjet ink was manufactured in the same manner as in Example 1.

Example 5

Besides setting the amount of the hindered amine in the resin solution to 2 mass parts and the amount of diethylene glycol diethyl ether to 23.5 mass parts, a non-aqueous inkjet ink was manufactured in the same manner as in Example 1.

Comparative Example 1

Besides not adding the hindered amine to the resin solution and setting the amount of diethylene glycol diethyl ether to 25.5 mass parts, a non-aqueous inkjet ink was manufactured in the same manner as in Example 1.

<Storage Property Test>

Approximately 50 g of each of the non-aqueous inkjet inks manufactured in Examples 1 to 5 and Comparative Example 1 were injected into a bag (approximately 8 cm long×approx. 9 cm wide) made of an aluminum laminate material and vacuum filling was performed, that is, an interior of the bag was degassed and then heat sealing was performed.

The bag was then left to stand under an environment of 90±1° C. to reproduce a thermal history during storage, which is considered to be one of triggers that start the radical polymerization reaction, and then opened four days later to determine, from a change of viscosity of the non-aqueous inkjet ink, whether or not the radical polymerization reaction occurred. That is, the viscosity of each non-aqueous inkjet ink was measured under conditions of 25±1° C. and 20 rpm before filling into the bag and after taking out from the bag and the difference in viscosity was determined to evaluate whether or not the radical polymerization reaction occurred according to the following standards.

Excellent: The difference in viscosity was less than 1.0 mPa·s and it was judged that the radical polymerization reaction did not proceed at all.

Good: The difference in viscosity was no less than 1.0 mPa·s and no more than 1.5 mPa·s and it was judged that the radical polymerization reaction hardly proceeded.

Nomal: The difference in viscosity was no less than 1.5 mPa·s and no more than 2.0 mPa·s and it was judged that although the radical polymerization reaction proceeded, there are no problems in terms of practical use.

Poor: The difference in viscosity was no less than 2.0 mPa·s or gelling of the polyvinyl chloride resin occurred and it was judged that the radical polymerization reaction proceeded.

<Hue Difference Evaluation>

Approximately 0.5 ml of each of the non-aqueous inkjet inks manufactured in Examples and Comparative Example were dropped onto a surface of a polyvinyl chloride sheet and after coating the ink onto the surface of the polyvinyl chloride sheet using a wire bar (0.1 mm diameter), hot air was blown on for approximately 20 seconds using a hairdryer, and thereafter the sheet was left to stand for 10 minutes at 25±1° C. to thereby prepare a drawdown sample.

A hue of the drawdown sample was measured using a handy type spectrophotometric color difference meter [NF999 made by Nippon Denshoku Industries Co., Ltd.]. With each drawdown sample, measurements were made at three locations and an average value was determined. A hue difference ΔE with respect to the drawdown sample formed using the non-aqueous inkjet ink of Comparative Example 1 that does not contain the polymerization inhibitor was determined, and whether a deviation of the hue was large or small was evaluated according to the following standards.

Good: The ΔE was less than 1.0 and it was judged that there was no deviation of hue.

Nomal: The ΔE was no less than 1.0 and less than 1.5 and it was judged that although the hue deviated slightly, there are no problems in terms of practical use.

Poor: The ΔE was no less than 1.5 and it was judged that deviation of hue occurred.

The results of the above are shown in Table 1.

TABLE 1

|  |  |  | Example 1 | Example 2 | Example 3 | Example 4 | Example 5 | Comparative Example 1 |
|---|---|---|---|---|---|---|---|---|
| Mass parts | Cyan pigment dispersion (pH = 8.6) |  | 30 | 30 | 30 | 30 | 30 | 30 |
|  | Organic solvent | 2EG-EM(pH = 6.8) | 22 | 22 | 22 | 22 | 22 | 22 |
|  |  | 2EG-2E(pH = 4.0) | 25.3 | 25 | 24.5 | 24 | 23.5 | 25.5 |
|  |  | 2EG-1E(pH = 7.6) | 18 | 18 | 18 | 18 | 18 | 18 |
|  |  | N-methyl-2-pyrrolidone (pH = 11.7) | — | — | — | — | — | — |
|  | Radical Polymerization inhibitor | UV10 (hindered amine compound) | 0.2 | 0.5 | 1 | 1.5 | 2 | — |
|  |  | UV22 (hindered phenol compound) | — | — | — | — | — | — |
|  | Binder resin | VINNOL E15/45 (emulsion polymerization) | 4 | 4 | 4 | 4 | 4 | 4 |
|  |  | SOLBIN CL (suspension polymerization) | — | — | — | — | — | — |
|  | Metal Coordination compound | 2-methyl imidazole (pH = 11.0) | — | — | — | — | — | — |
|  |  | 1-[N,N-bis(2-ethylhexyl) aminomethyl]benzotriazole (pH = 7.5) | 0.5 | 0.5 | 0.5 | 0.5 | 0.5 | 0.5 |
| Evaluation | Storage property |  | Normal | Excellent | Excellent | Excellent | Excellent | Poor |
|  | Hue difference ΔE |  | Good | Good | Good | Good | Normal | Reference |

From the results for Examples 1 to 5 and Comparative Example 1 shown in Table 1, it was found that by making the cyan non-aqueous inkjet ink that uses the phthalocyanine pigment as the pigment contain a hindered amine as the radical polymerization inhibitor, the radical polymerization reaction of the unreacted monomer and the accompanying gelling of the polyvinyl chloride resin can be prevented.

Also, from the results for Examples 1 to 5, it was found that in the cyan non-aqueous inkjet ink, the content proportion of the hindered amine with respect to the total amount of the non-aqueous inkjet ink is preferably no less than 0.2 mass % and especially preferably no less than 0.5 mass %, and preferably no more than 2 mass % and especially preferably no more than 1.5 mass %.

Example 6

As the binder resin, a vinyl chloride-vinyl acetate copolymer synthesized by the suspension polymerization method [SOLBIN (registered trademark) CL manufactured by Nissin Chemical Industry Co., Ltd., number average molecular weight Mn: 25000, vinyl acetate content: 14 mass %] was used in place of the vinyl chloride-vinyl acetate copolymer synthesized by the emulsion polymerization method.

Also, besides adding 4 mass parts of the vinyl chloride-vinyl acetate copolymer to the resin solution and setting the amount of the hindered amine to 1 mass part and the amount of diethylene glycol diethyl ether to 24.5 mass parts, a non-aqueous inkjet ink was manufactured in the same manner as in Example 1.

Comparative Example 2

Besides not adding the hindered amine to the resin solution and setting the amount of diethylene glycol diethyl ether to 25.5 mass parts, a non-aqueous inkjet ink was manufactured in the same manner as in Example 6.

Example 7

As the metal coordination compound, 2-methylimidazole (pH=11.0) was used in place 1-[N,N-bis(2-ethylhexyl)aminomethyl]benzotriazole.

Also, besides adding 0.5 mass parts of the 2-methylimidazole to the resin solution and setting the amount of the hindered amine to 1 mass part and the amount of diethylene glycol diethyl ether to 24.5 mass parts, a non-aqueous inkjet ink was manufactured in the same manner as in Example 1.

Example 8

N-methyl-2-pyrrolidone (pH=11.7) was used in place of diethylene glycol ethyl methyl ether.

Also, besides adding 22 mass parts of the N-methyl-2-pyrrolidone to the resin solution and setting the amount of the hindered amine to 1 mass part and the amount of diethylene glycol diethyl ether to 24.5 mass parts, anon-aqueous inkjet ink was manufactured in the same manner as in Example 1.

The storage property test and the hue difference evaluation were carried out on the non-aqueous inkjet inks manufactured in Examples 6 to 8. The results are shown in Table 2.

From the results for Examples 1 to 5 and Comparative Example 1 in the previous Table 1 and the results for Example 6 and Comparative Example 2 in Table 2, it was found that equivalent results are obtained using either of the resin synthesized by the suspension polymerization method and the resin synthesized by the emulsion polymerization method as the polyvinyl chloride resin.

Also, from the results of Examples 1 to 5 and Example 7, it was found that a benzotriazole is preferable as the metal coordination compound.

Further, from the results of Examples 1 to 5 and Example 8, it was found that it is preferable to use a combination of alkylene glycol derivatives all having a pH of 2 to 9 as the organic solvent, and that combined use of diethylene glycol ethyl methyl ether, diethylene glycol diethyl ether, which is the preferable second solvent, and diethylene glycol monoethyl ether, which is the preferable third solvent, is especially preferable.

Example 9

A mixture in which α,α',α''-1,2,3-propanetriyltris[ω-[(1-oxo-2-propene-1-yl)oxy]]-poly[oxy(methyl-1,2-ethanediyl)] has 2,6-bis(1,1-dimethylethyl)-4-(phenylmethylene)-2,5-cyclohexadine-1-one mixed therein as an effective component [Irgastab UV22 made by Ciba Specialty Chemicals Corp. (mixture of 76 to 90 mass % of the former and 24 to 10 mass % of the latter)] was used as a hindered phenol radical polymerization inhibitor in place of the hindered amine.

Also, besides adding 1 mass part of the hindered phenol to the resin solution and setting the amount of diethylene glycol diethyl ether to 24.5 mass parts, a non-aqueous inkjet ink was manufactured in the same manner as in Example 1.

Example 10

Besides setting the amount of the hindered phenol in the resin solution to 1.5 mass parts and the amount of diethylene

TABLE 2

|  |  |  | Example 6 | Example 7 | Example 8 | Comparative Example 2 |
|---|---|---|---|---|---|---|
| Mass parts | Cyan pigment dispersion (pH = 8.6) |  | 30 | 30 | 30 | 30 |
|  | Organic Solvent | 2EG-EM(pH = 6.8) | 22 | 22 | — | 22 |
|  |  | 2EG-2E(pH = 4.0) | 24.5 | 24.5 | 24.5 | 25.5 |
|  |  | 2EG-1E(pH = 7.6) | 18 | 18 | 18 | 18 |
|  |  | N-methyl-2-pyrrolidone (pH = 11.7) | — | — | 22 | — |
|  | Radical Polymerization inhibitor | UV10 (hindered amine compound) | 1 | 1 | 1 | — |
|  |  | UV22 (hindered phenol compound) | — | — | — | — |
|  | Binder resin | VINNOL E15/45 (emulsion polymerization) | — | 4 | 4 | — |
|  |  | SOLBIN CL (suspension polymerization) | 4 | — | — | 4 |
|  | Metal Coordination compound | 2-methylimidazole (pH = 11.0) | — | 0.5 | — | — |
|  |  | 1-[N,N-bis(2-ethylhexyl) aminomethyl]benzotriazole (pH = 7.5) | 0.5 | — | 0.5 | 0.5 |
| Evaluation | Storage property |  | Excellent | Good | Good | Poor |
|  | Hue difference ΔE |  | Good | Good | Good | Good | glycol diethyl ether to 24 mass parts, a non-aqueous inkjet ink was manufactured in the same manner as in Example 9.

Example 11

Besides setting the amount of the hindered phenol in the resin solution to 2 mass parts and the amount of diethylene glycol diethyl ether to 23.5 mass parts, a non-aqueous inkjet ink was manufactured in the same manner as in Example 9.

Example 12

N-methyl-2-pyrrolidone (pH=11.7) was used in place of diethylene glycol ethyl methyl ether.

Also, besides adding 22 mass parts of the N-methyl-2-pyrrolidone to the resin solution and setting the amount of the hindered phenol to 1.5 mass parts and the amount of diethylene glycol diethyl ether to 24 mass parts, a non-aqueous inkjet ink was manufactured in the same manner as in Example 9.

The storage property test and the hue difference evaluation were carried out on the non-aqueous inkjet inks manufactured in Examples 9 to 12. The results are shown in Table 3.

vinyl acetate copolymer synthesized by the emulsion polymerization method [VINNOL (registered trademark) E15/45 made by Wacker Chemie AG, weight average molecular weight Mw: 45000 to 55000, vinyl acetate content: 15.0±1.0 mass %] were added and dispersed as a binder resin, and thereafter 25.45 mass parts of diethylene glycol diethyl ether (2EG-2E, pH=4.0) were added to swell the copolymer.

Then, while continuing to stir, 22 mass parts of diethylene glycol ethyl methyl ether (2EG-EM, pH=6.8) were added to dissolve the copolymer, and thereafter, 0.05 mass parts of the mixture in which α,α',α"-1,2,3-propanetriyltris[ω-[(1-oxo-2-propen-1-yl)oxy]]-poly[oxy(methyl-1,2-ethanediyl)] has 2,6-bis(1,1-dimethylethyl)-4-(phenylmethylene)-2,5-cyclohexadine-1-one mixed therein as the effective component [Irgastab UV22 made by Ciba Specialty Chemicals Corp. (mixture of 76 to 90 mass % of the former and 24 to 10 mass % of the latter)] as a hindered phenol (radical polymerization inhibitor) and 0.5 mass parts of 1-[N,N-bis(2-ethylhexyl) aminomethyl]benzotriazole (pH measured in the state of 5% aqueous solution=7.5) as a metal coordination compound were added to prepare a resin solution.

TABLE 3

| | | | Example 9 | Example 10 | Example 11 | Example 12 |
|---|---|---|---|---|---|---|
| Mass parts | Cyan pigment dispersion (pH = 8.6) | | 30 | 30 | 30 | 30 |
| | Organic Solvent | 2EG-EM(pH = 6.8) | 22 | 22 | 22 | — |
| | | 2EG-2E(pH = 4.0) | 24.5 | 24 | 23.5 | 24 |
| | | 2EG-1E(pH = 7.6) | 18 | 18 | 18 | 18 |
| | | N-methyl-2-pyrrolidone (pH = 11.7) | — | — | — | 22 |
| | Radical Polymerization inhibitor | UV10 (hindered amine compound) | — | — | — | — |
| | | UV22 (hindered phenol compound) | 1 | 1.5 | 2 | 1.5 |
| | Binder resin | VINNOL E15/45 (emulsion polymerization) | 4 | 4 | 4 | 4 |
| | | SOLBIN CL (suspension polymerization) | — | — | — | — |
| | Metal Coordination compound | 2-methylimidazole (pH = 11.0) | — | — | — | — |
| | | 1-[N,N-bis(2-ethylhexyl) aminomethyl]benzotriazole (pH = 7.5) | 0.5 | 0.5 | 0.5 | 0.5 |
| Evaluation | Storage property | | Normal | Good | Good | Normal |
| | Hue difference ΔE | | Good | Good | Normal | Good |

From the results for Examples 1 to 5 in the previous Table 1 and the results for Examples 9 to 12 in Table 3, it was found that with the cyan non-aqueous inkjet ink, although a hindered phenol can be used as the radical polymerization inhibitor, a hindered amine is more effective in terms of the effect of inhibiting the radical polymerization reaction of the unreacted monomer and preventing the gelling of the polyvinyl chloride resin.

Also, from the results of Examples 9 to 11 and Example 12, it was found that, even in the non-aqueous inkjet ink using a hindered phenol, it is preferable to use a combination of alkylene glycol derivatives all having a pH of 2 to 9 as the organic solvent and that combined use of diethylene glycol ethyl methyl ether, diethylene glycol diethyl ether, which is the preferable second solvent, and diethylene glycol monoethyl ether, which is the preferable third solvent, is especially preferable.

<Magenta Ink>

Example 13

While stirring 18 mass parts of diethylene glycol monoethyl ether (2EG-1E, pH=7.6), 4 mass parts of a vinyl chloride- A pigment dispersion was prepared in which C. I. Pigment Red 122 was dispersed as a quinacridone pigment in diethylene glycol diethyl ether (pigment concentration 15 mass %, pH=7.6), and 30 mass parts of the pigment dispersion were added to 70 mass parts of the resin solution prepared in advance and further stirring was performed to form a uniform phase and thereby manufacture a non-aqueous inkjet ink.

Example 14

Besides setting the amount of the hindered phenol in the resin solution to 0.1 mass parts and the amount of diethylene glycol diethyl ether to 25.4 mass parts, a non-aqueous inkjet ink was manufactured in the same manner as in Example 13.

Example 15

Besides setting the amount of the hindered phenol in the resin solution to 0.5 mass parts and the amount of diethylene glycol diethyl ether to 25 mass parts, a non-aqueous inkjet ink was manufactured in the same manner as in Example 13.

Example 16

Besides setting the amount of the hindered phenol in the resin solution to 1 mass part and the amount of diethylene glycol diethyl ether to 24.5 mass parts, a non-aqueous inkjet ink was manufactured in the same manner as in Example 13.

Example 17

Besides setting the amount of the hindered phenol in the resin solution to 2 mass parts and the amount of diethylene glycol diethyl ether to 23.5 mass parts, a non-aqueous inkjet ink was manufactured in the same manner as in Example 13.

Example 18

4,4'-[(1,10-dioxo-1,10-decanediyl)bis(oxy)]bis[2,2,6,6-tetramethyl]-1-piperidinyloxy [product equivalent to Irgastab (registered trademark) UV10 made by Ciba Specialty Chemicals Corp.] was used as a hindered amine radical polymerization inhibitor in place of the hindered phenol.

Also, besides adding 1 mass part of the hindered amine to the resin solution and setting the amount of diethylene glycol diethyl ether to 24.5 mass parts, a non-aqueous inkjet ink was manufactured in the same manner as in Example 13.

The storage property test and the hue difference evaluation were carried out on the non-aqueous inkjet inks manufactured in Examples 13 to 18. For the hue difference evaluation, a drawdown sample formed using a separately-prepared magenta non-aqueous inkjet ink that does not contain a polymerization inhibitor was used as a reference. The results are shown in Table 4.

than 0.05 mass % and especially preferably no less than 0.1 mass %, and preferably no more than 2 mass % and especially preferably no more than 1 mass %.

<Yellow Ink>

Example 19

While stirring 18 mass parts of diethylene glycol monoethyl ether (2EG-1E, pH=7.6), 4 mass parts of a vinyl chloride-vinyl acetate copolymer synthesized by the emulsion polymerization method [VINNOL (registered trademark) E15/45 made by Wacker Chemie AG, weight average molecular weight Mw: 45000 to 55000, vinyl acetate content: 15.0±1.0 mass %] were added and dispersed as a binder resin, and thereafter 25.45 mass parts of diethylene glycol diethyl ether (2EG-2E, pH=4.0) were added to swell the copolymer.

Then, while continuing to stir, 22 mass parts of diethylene glycol ethyl methyl ether (2EG-EM, pH=6.8) were added to dissolve the copolymer, and thereafter, 0.05 mass parts of 4,4'-[(1,10-dioxo-1,10-decanediyl)bis(oxy)]bis[2,2,6,6-tetramethyl]-1-piperidinyloxy [product equivalent to Irgastab (registered trademark) UV10 made by Ciba Specialty Chemicals Corp.] as a hindered amine (radical polymerization inhibitor) and 0.5 mass parts of 1-[N,N-bis(2-ethylhexyl) aminomethyl]benzotriazole (pH measured in the state of 5% aqueous solution=7.5) as a metal coordination compound were added to prepare a resin solution.

A pigment dispersion was prepared in which C. I. Pigment Yellow 150 was dispersed as a chelate azo pigment in diethylene glycol diethyl ether (pigment concentration 15 mass %, pH=6.5), and 30 mass parts of the pigment dispersion were

TABLE 4

|  |  |  | Example 13 | Example 14 | Example 15 | Example 16 | Example 17 | Example 18 |
|---|---|---|---|---|---|---|---|---|
| Mass parts | Magenta pigment dispersion (pH = 7.6) |  | 30 | 30 | 30 | 30 | 30 | 30 |
|  | Organic solvent | 2EG-EM(pH = 6.8) | 22 | 22 | 22 | 22 | 22 | 22 |
|  |  | 2EG-2E(pH = 4.0) | 25.45 | 25.4 | 25 | 24.5 | 23.5 | 24.5 |
|  |  | 2EG-1E(pH = 7.6) | 18 | 18 | 18 | 18 | 18 | 18 |
|  |  | N-methyl-2-pyrrolidone (pH = 11.7) | — | — | — | — | — | — |
|  | Radical Polymerization inhibitor | UV10 (hindered amine compound) | — | — | — | — | — | 1 |
|  |  | UV22 (hindered phenol compound) | 0.05 | 0.1 | 0.5 | 1 | 2 | — |
|  | Binder resin | VINNOL E15/45 (emulsion polymerization) | 4 | 4 | 4 | 4 | 4 | 4 |
|  |  | SOLBIN CL (suspension polymerization) | — | — | — | — | — | — |
|  | Metal Coordination compound | 2-methylimidazole (pH = 11.0) | — | — | — | — | — | — |
|  |  | 1-[N,N-bis(2-ethylhexyl) aminomethyl]benzotriazole (pH = 7.5) | 0.5 | 0.5 | 0.5 | 0.5 | 0.5 | 0.5 |
| Evaluation | Storage property |  | Normal | Excellent | Excellent | Excellent | Excellent | Normal |
|  | Hue difference ΔE |  | Good | Good | Good | Good | Normal | Good |

From the results for Examples 13 to 17 and Example 18 in Table 4, it was found that with the magenta non-aqueous inkjet ink using the quinacridone pigment as the pigment, although a hindered amine can be used as the radical polymerization inhibitor, a hindered phenol is more effective in terms of the effect of inhibiting the radical polymerization reaction of the unreacted monomer and preventing the gelling of the polyvinyl chloride resin.

Also, from the results of Examples 13 to 17, it was found that in the magenta non-aqueous inkjet ink, the content proportion of the hindered phenol with respect to the total amount of the non-aqueous inkjet ink is preferably no less added to 70 mass parts of the resin solution prepared in advance and further stirring was performed to form a uniform phase and thereby manufacture a non-aqueous inkjet ink.

Example 20

Besides setting the amount of the hindered amine in the resin solution to 0.1 mass parts and the amount of diethylene glycol diethyl ether to 25.4 mass parts, a non-aqueous inkjet ink was manufactured in the same manner as in Example 19.

Example 21

Besides setting the amount of the hindered amine in the resin solution to 0.3 mass parts and the amount of diethylene glycol diethyl ether to 25.2 mass parts, a non-aqueous inkjet ink was manufactured in the same manner as in Example 19.

Example 22

Besides setting the amount of the hindered amine in the resin solution to 0.5 mass parts and the amount of diethylene glycol diethyl ether to 25 mass parts, a non-aqueous inkjet ink was manufactured in the same manner as in Example 19.

Example 23

Besides setting the amount of the hindered amine in the resin solution to 2 mass parts and the amount of diethylene glycol diethyl ether to 23.5 mass parts, a non-aqueous inkjet ink was manufactured in the same manner as in Example 19.

The storage property test and the hue difference evaluation were carried out on the non-aqueous inkjet inks manufactured in Examples 19 to 23. For the hue difference evaluation, a drawdown sample formed using a separately-prepared yellow non-aqueous inkjet ink that does not contain a polymerization inhibitor was used as a reference. The results are shown in Table 5.

vinyl acetate copolymer synthesized by the emulsion polymerization method [VINNOL (registered trademark) E15/45 made by Wacker Chemie AG, weight average molecular weight Mw: 45000 to 55000, vinyl acetate content: 15.0±1.0 mass %] were added and dispersed as a binder resin, and thereafter 25.45 mass parts of diethylene glycol diethyl ether (2EG-2E, pH=4.0) were added to swell the copolymer.

Then, while continuing to stir, 22 mass parts of diethylene glycol ethyl methyl ether (2EG-EM, pH=6.8) were added to dissolve the copolymer, and thereafter, 0.05 mass parts of 4,4'-[(1,10-dioxo-1,10-decanediyl)bis(oxy)]bis[2,2,6,6-tetramethyl]-1-piperidinyloxy [product equivalent to Irgastab (registered trademark) UV10 made by Ciba Specialty Chemicals Corp.] as a hindered amine (radical polymerization inhibitor) and 0.5 mass parts of 1-[N,N-bis(2-ethylhexyl) aminomethyl]benzotriazole (pH measured in the state of 5% aqueous solution=7.5) as a metal coordination compound were added to prepare a resin solution.

A pigment dispersion was prepared in which carbon black was dispersed in diethylene glycol diethyl ether (pigment concentration 15 mass %, pH=5.8), and 30 mass parts of the pigment dispersion were added to 70 mass parts of the resin solution prepared in advance and further stirring was performed to form a uniform phase and thereby manufacture a non-aqueous inkjet ink.

TABLE 5

|  |  |  | Example 19 | Example 20 | Example 21 | Example 22 | Example 23 |
|---|---|---|---|---|---|---|---|
| Mass parts | Yellow pigment dispersion (pH = 6.5) |  | 30 | 30 | 30 | 30 | 30 |
|  | Organic Solvent | 2EG-EM(pH = 6.8) | 22 | 22 | 22 | 22 | 22 |
|  |  | 2EG-2E(pH = 4.0) | 25.45 | 25.4 | 25.2 | 25 | 23.5 |
|  |  | 2EG-1E(pH = 7.6) | 18 | 18 | 18 | 18 | 18 |
|  |  | N-methyl-2-pyrrolidone (pH = 11.7) | — | — | — | — | — |
|  | Radical Polymerization inhibitor | UV10 (hindered amine compound) | 0.05 | 0.1 | 0.3 | 0.5 | 2 |
|  |  | UV22 (hindered phenol compound) | — | — | — | — | — |
|  | Binder resin | VINNOL E15/45 (emulsion polymerization) | 4 | 4 | 4 | 4 | 4 |
|  |  | SOLBIN CL (suspension polymerization) | — | — | — | — | — |
|  | Metal Coordination compound | 2-methylimidazole (pH = 11.0) | — | — | — | — | — |
|  |  | 1-[N,N-bis(2-ethylhexyl) aminomethyl]benzotriazole (pH = 7.5) | 0.5 | 0.5 | 0.5 | 0.5 | 0.5 |
| Evaluation | Storage property |  | Normal | Excellent | Excellent | Excellent | Excellent |
|  | Hue difference ΔE |  | Good | Good | Good | Good | Normal |

From the results for Examples 19 to 23 in Table 5, it was found that with the yellow non-aqueous inkjet ink using a chelate azo pigment as the pigment, the content proportion with respect to the total amount of the non-aqueous inkjet ink of the hindered amine as the radical polymerization inhibitor is preferably no less than 0.05 mass % and especially preferably no less than 0.1 mass %, and preferably no more than 2 mass % and especially preferably no more than 0.5 mass %.

<Black Ink>

Example 24

While stirring 18 mass parts of diethylene glycol monoethyl ether (2EG-1E, pH=7.6), 4 mass parts of a vinyl chloride-

Example 25

Besides setting the amount of the hindered amine in the resin solution to 0.1 mass parts and the amount of diethylene glycol diethyl ether to 25.4 mass parts, a non-aqueous inkjet ink was manufactured in the same manner as in Example 24.

Example 26

Besides setting the amount of the hindered amine in the resin solution to 0.3 mass parts and the amount of diethylene glycol diethyl ether to 25.2 mass parts, a non-aqueous inkjet ink was manufactured in the same manner as in Example 24.

Example 27

Besides setting the amount of the hindered amine in the resin solution to 0.5 mass parts and the amount of diethylene glycol diethyl ether to 25 mass parts, a non-aqueous inkjet ink was manufactured in the same manner as in Example 24.

Example 28

Besides setting the amount of the hindered amine in the resin solution to 2 mass parts and the amount of diethylene glycol diethyl ether to 23.5 mass parts, a non-aqueous inkjet ink was manufactured in the same manner as in Example 24.

The storage property test and the hue difference evaluation were carried out on the non-aqueous inkjet inks manufactured in Examples 24 to 28. For the hue difference evaluation, a drawdown sample formed using a separately-prepared black non-aqueous inkjet ink that does not contain a polymerization inhibitor was used as a reference. The results are shown in Table 6.

TABLE 6

| | | | Example 24 | Example 25 | Example 26 | Example 27 | Example 28 |
|---|---|---|---|---|---|---|---|
| Mass parts | Black pigment dispersion (pH = 5.8) | | 30 | 30 | 30 | 30 | 30 |
| | Organic solvent | 2EG-EM(pH = 6.8) | 22 | 22 | 22 | 22 | 22 |
| | | 2EG-2E(pH = 4.0) | 25.45 | 25.4 | 25.2 | 25 | 23.5 |
| | | 2EG-1E(pH = 7.6) | 18 | 18 | 18 | 18 | 18 |
| | | N-methyl-2-pyrrolidone (pH = 11.7) | — | — | — | — | — |
| | Radical Polymerization inhibitor | UV10 (hindered amine compound) | 0.05 | 0.1 | 0.3 | 0.5 | 2 |
| | | UV22 (hindered phenol compound) | — | — | — | — | — |
| | Binder resin | VINNOL E15/45 (emulsion polymerization) | 4 | 4 | 4 | 4 | 4 |
| | | SOLBIN CL (suspension polymerization) | — | — | — | — | — |
| | Metal Coordination compound | 2-methylimidazole (pH = 11.0) | — | — | — | — | — |
| | | 1-[N,N-bis(2-ethylhexyl) aminomethyl]benzotriazole (pH = 7.5) | 0.5 | 0.5 | 0.5 | 0.5 | 0.5 |
| Evaluation | Storage property | | Normal | Excellent | Excellent | Excellent | Excellent |
| | Hue difference $\Delta E$ | | Good | Good | Good | Good | Normal |

From the results for Examples 24 to 28 in Table 6, it was found that with the black non-aqueous inkjet ink using carbon black as the pigment, the content proportion with respect to the total amount of the non-aqueous inkjet ink of the hindered amine as the radical polymerization inhibitor is preferably no less than 0.05 mass % and especially preferably no less than 0.1 mass %, and preferably no more than 2 mass % and especially preferably no more than 0.5 mass %.

What is claimed is:

1. A non-aqueous inkjet ink, comprising:
   a polyvinyl chloride resin synthesized by a suspension polymerization method or an emulsion polymerization method;
   an organic solvent that is a mixed solvent comprising N-methyl-2-pyrrolidone, diethylene glycol diethyl ether, and diethylene glycol monoethyl ether in which the polyvinyl chloride resin is dissolved;
   a pigment; and
   a radical polymerization inhibitor.

2. The non-aqueous inkjet ink according to claim 1, wherein the radical polymerization inhibitor is selected from the group consisting of hydroquinones, catechols, hindered amines, phenols, phenothiazines, condensed aromatic ring quinones, and combinations thereof.

3. The non-aqueous inkjet ink according to claim 1, wherein the polyvinyl chloride resin is a vinyl chloride-vinyl acetate copolymer, and wherein the vinyl chloride-vinyl acetate copolymer has a vinyl content that is no less than 1 mass % and no more than 36 mass %.

4. The non-aqueous inkjet ink according to claim 1, wherein the non-aqueous inkjet ink further comprises a benzotriazole.

5. The non-aqueous inkjet ink according to claim 1, wherein the pigment is a phthalocyanine pigment, and wherein the radical polymerization inhibitor is a hindered amine present in an amount based on total amount of the non-aqueous inkjet ink that is no less than 0.2 mass % and no more than 2 mass %.

6. The non-aqueous inkjet ink according to claim 1, wherein the pigment is a quinacridone pigment, and wherein the radical polymerization inhibitor is a hindered phenol present in an amount based on total amount of the non-aqueous inkjet ink that is no less than 0.05 mass % and no more than 2 mass %.

7. The non-aqueous inkjet ink according to claim 1, wherein the pigment is a chelate azo pigment, and wherein the radical polymerization inhibitor is a hindered amine present in an amount based on total amount of the non-aqueous inkjet ink that is no less than 0.05 mass % and no more than 2 mass %.

8. The non-aqueous inkjet ink according to claim 1, wherein the pigment is carbon black, and wherein the radical polymerization inhibitor is a hindered amine present in an amount based on total amount of the non-aqueous inkjet ink that is no less than 0.05 mass % and no more than 2 mass %.

9. An ink set of inkjet inks, comprising:
   a combination of non-aqueous inkjet inks according to claim 1 having respective colors and including at least:
   a cyan ink having a cyan color;
   a magenta ink having a magenta color;
   a yellow ink having a yellow color; and
   a black ink having a black color.

* * * * *

UNITED STATES PATENT AND TRADEMARK OFFICE
CERTIFICATE OF CORRECTION

PATENT NO. : 8,629,198 B2  
APPLICATION NO. : 12/929557  
DATED : January 14, 2014  
INVENTOR(S) : Isobe et al.

Page 1 of 1

It is certified that error appears in the above-identified patent and that said Letters Patent is hereby corrected as shown below:

On the Title Page, Item [73] should read:

-- General Co., Ltd., Osaka (JP) --

Signed and Sealed this  
First Day of July, 2014

Michelle K. Lee  
*Deputy Director of the United States Patent and Trademark Office*